Figure 1:
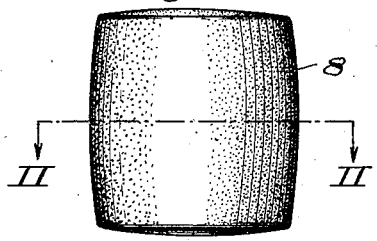

Feb. 5, 1946.   J. URMSTON   2,394,122
MANUFACTURE OF RUBBER OR RUBBER-LIKE PRODUCT
Filed Dec. 15, 1941

INVENTOR
James Urmston
by his attys
Stebbins and Blenko

Patented Feb. 5, 1946

2,394,122

UNITED STATES PATENT OFFICE 2,394,122

MANUFACTURE OF RUBBER OR RUBBERLIKE PRODUCTS

James Urmston, Montclair, N. J., assignor to Callender's Cable & Construction Company Limited, a corporation of England Application December 15, 1941, Serial No. 423,045

5 Claims. (Cl. 18—53)

This invention relates to a rubber product or a product made from materials having qualities similar to rubber such as artificial rubber; for example, neoprene. My invention is particularly suitable for use with natural rubber. However, it should be understood that whenever throughout this application I refer to "rubber," I intend to refer not only to natural rubber but to all materials having qualities similar to rubber.

My invention particularly relates to cellular expanded rubber. By cellular expanded rubber, I mean vulcanized rubber in cellular form, that is, rubber having a number of separate cells. This condition is to be distinguished from a sponge-like condition in which the solid material contains a number of connected cells and passages. In the cellular form the interconnection does not exist. In essence, a body or block of cellular expanded rubber comprises a large number of very small balloons held together by a rubber matrix. The "balloons" contain gas, generally nitrogen, under pressure.

Cellular expanded rubber has a wide variety of uses. It is particularly useful as a buoyancy element for supporting on the surface of water articles which are heavier than water. When used as such an element, the cellular expanded rubber is formed into blocks or bodies of sizes and shapes such that they may be readily attached to or inserted into the article to be floated.

Heretofore, difficulty has been encountered in the use of cellular expanded rubber to form buoyancy elements because the blocks, after being manufactured, have a tendency to disintegrate or to collapse through loss of gas when subjected to heat. As stated above, a body of cellular expanded rubber comprises a large number of small cells containing gas under pressure. The walls of the cells are necessarily very thin and unless the body is externally supported, the cells on the exterior surface of the body tend to rupture. The next row of cells is then unsupported and these cells rupture. There is thus a progressive breaking down of the body of expanded rubber from the periphery towards the center. Such disintegration greatly impairs the usefulness of the expanded rubber particularly as a buoyancy element because the body or block, after disintegration into sponge rubber, fills with water. Also the gas within the rubber cells gradually leaks out and in time the body of cellular rubber will collapse.

By my invention I prevent cellular expanded rubber from disintegrating. I provide bodies or blocks of cellular expanded rubber having the desired size and shape and covered with a skin or sheath of rubber. This sheath is substantially gas impermeable and supports the outer cells of the body and prevents them from rupturing. The escape of gas from the cells is also greatly diminished. I have also invented processes whereby such bodies of cellular rubber may be manufactured.

Figure 2:
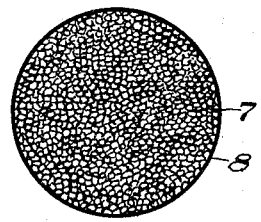

In the accompanying drawing I have shown a present preferred embodiment of my invention in which Figure 1 is an elevation of a short cylinder of expanded rubber which may be used as a buoyancy element and Figure 2 is a cross-section along the lines II—II of Figure 1 and Figures 3 to 6 inclusive are longitudinal sections of molds used in manufacturing the cellular expanded rubber product which I have invented.

Figure 3:
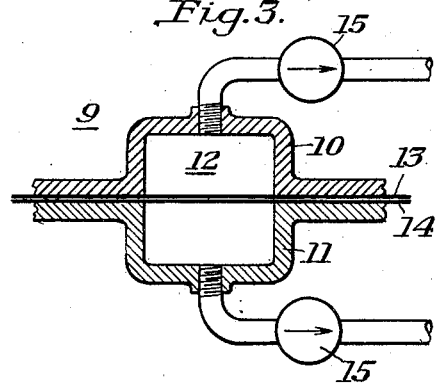

Figure 3 illustrates a method of lining the two halves 10 and 11 of a mold with sheets 13 and 14 of unvulcanized rubber.

Figure 4:
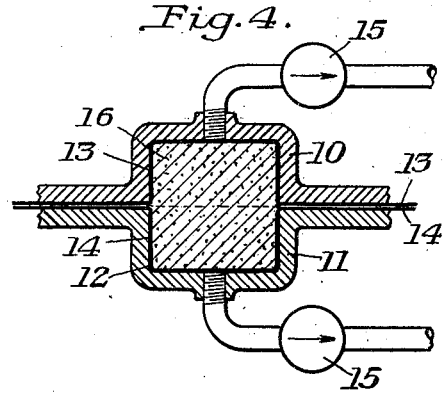

Figure 4 illustrates the same mold after the mold parts have been lined with the rubber sheets, a rubber mix containing unvulcanized rubber and a gas-forming substance has been placed in the mold and the two halves of the mold have been brought together so as to form the rubber mix into a block which is surrounded with a rubber envelope formed by the sheets 13 and 14.

Figure 5:
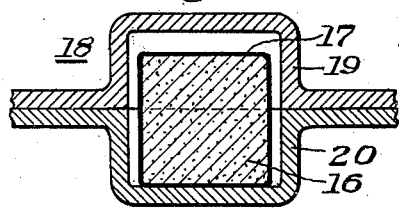

Figure 5 shows a mold 18 which is larger than the mold 10—11 but is smaller than the dimensions of the finished article, the mold 18 being shown with the block 16 of rubber mix having the envelope 17 formed from the rubber sheets 13 and 14 entirely surrounding the block 16. This figure illustrates the relative size of the mold cavity and the rubber block 16 before the mold is heated to expand the rubber mix.

Figure 6:
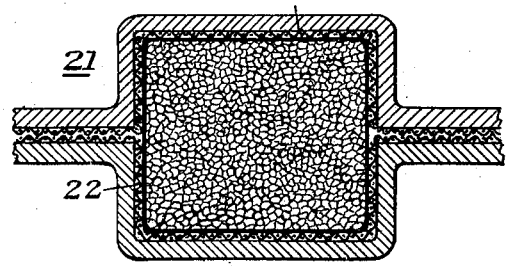

Figure 6 shows a mold 21 used for further expanding the partially expanded cellular rubber body produced by heating the block 16 in the mold 18 of Figure 2. The cavity in the mold 21 is larger than the cavity in the mold 18 but is of substantially the same dimensions as the dimensions of the finished expanded cellular rubber article which it is desired to make. The mold 21 is provided with wire gauze 22 which permits the escape of a small quantity of gas from the body of the article through the envelope whereby the pressure in the cells is equalized and the body is stabilized.

Figure 1 shows a body of cellular expanded rubber which is in the shape of a short cylinder which may be used as a buoyancy element. As shown in Figure 2, the element comprises a body portion of soft cellular expanded rubber 7. The body 7 is enclosed within a thin rubber skin or sheath 8 which is preferably vulcanized to the body 7 although it is not necessary to do this.

Cellular expanded rubber per se can be made by several known processes. For use with my invention I prefer the process in which diazoaminobenzene and a vulcanizing accelerator are incorporated in a rubber mix in such proportions that partial vulcanization of the rubber occurs before the diazoaminobenzene decomposes sufficiently to release a substantial amount of nitrogen. The uncured rubber mix is then placed in a mold and heated to a temperature approximating 280° F. The essential feature of any of the processes is the formation of small gas-filled cells in the rubber mix and the partial cure of the rubber forming the walls of these cells before complete expansion of the gas. The walls of the cells then have sufficient strength to withstand complete expansion of the gas and the rubber does not break down into sponge.

The rubber which is used for forming the skin or sheath around the body of expanded rubber is preferably properly chosen so that it will readily vulcanize to the cellular expanded rubber.

Figure 3 illustrates the first step in the manufacture of a cellular expanded rubber body which is covered with a sheath in accordance with my invention. Figure 3 shows in cross-section a mold, generally indicated by the reference number 9, which is divided into two parts 10 and 11. In practice, a plurality of these molds will be formed into a single metallic plate. The parts 10 and 11 enclose a space 12 which is of the same shape but of smaller dimensions than the desired shape and size of the finished product. Thus, if it is desired to make the cylinder shown in Figures 1 and 2 of the drawing with a diameter at the mid-point of 3¼" and with a height of 3½" or 4", the mold parts 10 and 11 form a space 12 of cylindrical shape having a diameter of approximately 1.8" and a length of approximately 1.8".

The parts 10 and 11 are assembled facing each other and two sheets of unvulcanized rubber 13 and 14 are then placed between them. A vacuum is then applied in the space within each of the mold parts by the vacuum pumps 15. The vacuum causes the rubber sheets 13 and 14 to line the interior portions of the mold parts 10 and 11 as shown in Figure 4.

An amount of uncured rubber mix 16 sufficient to fill the space 12 and having a gas producing substance or "blowing agent" incorporated therein is placed within the lined mold. The mold parts 10 and 11 are then closed to seal together the two sheets 13 and 14.

The rubber envelope 17 formed by the sealing together of the sheets 13 and 14 and having the uncured rubber mix therein is then placed in a mold, generally designated by the reference number 18, and having two parts 19 and 20 as shown in Figure 5 of the drawing. The mold 18 is designed to enclose a space having slightly larger dimensions than the space 12 enclosed by the mold 9. For the article cited in the preceding paragraphs as an example, a space 2" in diameter and 2" long is suitable. The mold 18 is then heated to vulcanize the rubber envelope 17 and the rubber in the uncured rubber mix 16. The gas evolved by the "blowing agent" contained in the rubber mix 16 will cause the rubber to expand and will form a large number of cells within the body of the expanded rubber. At the same time the rubber envelope 17 is vulcanized to the expanded rubber.

After the rubber has been expanded and vulcanized to the desired extent, the mold 18 is opened and, as indicated above, the body of expanded rubber and the sheath will expand to a size slightly larger than the size of the space enclosed by the mold 18. If desired, an additional "stabilizing" step may be taken. The article, after being finished as described above, is placed in a mold, generally indicated by the reference number 21, in Figure 6 of the drawing which is similar to the mold 18 except that it has a lining of metallic gauze 22 on the inner surface of the two halves of the mold. The mold 21 also differs from the mold 18 in that it encloses a space having the same dimensions as the desired dimensions of the finished article. The body of cellular expanded rubber with its sheath is placed within the mold 21 and heated. The mold 21 prevents the body of expanded rubber from expanding while it is being heated and produces equalization of the gas pressure throughout the cells of the rubber and, at the same time, permits the escape of a small amount of gas from the cells of the expanded rubber through the gauze 22. This treatment thus removes some of the gas from within the cellular body. After this "stabilizing" treatment, the rubber cylinder may be heated and expanded but upon cooling it will return to its original size. In other words, heating and expansion of the rubber cylinder will not cause permanent deformation of the cylinder.

The rubber product may also be manufactured by first making a body of cellular expanded rubber of the desired final size and shape. This could be accomplished by placing uncured rubber compound without a rubber envelope in a mold similar to mold 18 but having a cavity whose size and shape are substantially the same as those of the finished article and heating to expand and vulcanize the rubber compound. The body of expanded rubber is then covered by a sheath by methods similar to the method described with reference to Figures 3 and 4 of the drawing. The sheet is then vulcanized by heating the mold. Alternatively, vulcanized rubber may be used for the sheets 13 and 14, in which case the sheets are sealed together by a suitable rubber cement. Since the rubber sheath is not under tension because of expansion of the expanded rubber after removal from the curing mold, there is less tendency of the sheath to press gas out of the cellular body. Gas will diffuse more slowly from the cellular body and the life of the article will be lengthened accordingly.

Instead of covering a body of expanded rubber in a sheath by means of a sheet of rubber as just described above, a body of cellular expanded rubber of the desired size and shape may be dipped into a latex solution. The latex is then vulcanized. Alternatively, a layer of uncured rubber may be extruded or lapped around a body of cellular expanded rubber and then vulcanized.

While I have described certain present preferred embodiments of my invention, it is to be distinctly understood that my invention may be otherwise variously embodied within the scope of the following claims.

I claim:

1. The manufacture of a cellular expanded rubber product which comprises lining a mold with a sheet of rubber, placing within said mold a compound containing unvulcanized rubber and a substance which evolves gas on being heated, assembling the mold to form an envelope completely surrounding and contacting the compound, transferring the envelope containing the compound to a second mold having a larger mold cavity than the envelope forming mold, and thereafter heating the second mold to expand and vulcanize the rubber of the compound.

2. The manufacture of a cellular expanded rubber product which comprises lining a mold with a sheet of unvulcanized rubber, placing within said mold a compound containing unvulcanized rubber and a substance which evolves gas on being heated, assembling the mold to form an envelope completely surrounding and contacting the compound, transferring the envelope containing the compound to a second mold having a larger mold cavity than the envelope forming mold and thereafter heating the mold to expand and vulcanize the rubber of the compound and to vulcanize the envelope to the expanded rubber.

3. The manufacture of a cellular expanded rubber article of given dimensions, which comprises forming a body in a first mold from a rubber mix containing unvulcanized rubber and a substance which evolves gas on being heated, said body as formed in said first mold being of smaller dimensions than the dimensions of the finished article and having an envelope of unvulcanized rubber surrounding it, transferring the envelope containing the body to a second mold having a mold cavity whose dimensions are greater than said enveloped body but less than the dimensions of the finished article, heating the second mold to expand and partially vulcanize said body and envelope, transferring the partially vulcanized and expanded enveloped body to a third mold having a mold cavity whose dimensions are substantially the same as those of the finished article, and heating the third mold while permitting the escape of a small quantity of gas from the body through the envelope, whereby the pressure in the cells is equalized and the body is stabilized.

4. The manufacture of a cellular expanded rubber article of given dimensions, which comprises forming a body from a rubber mix containing unvulcanized rubber and a substance which evolves gas on being heated, said body being of smaller dimensions than the dimensions of the finished article and having an envelope of unvulcanized rubber surrounding it, transferring the envelope containing the body to a mold having a mold cavity whose dimensions are greater than said enveloped body but less than the dimensions of the finished article, heating the mold to expand and partially vulcanize said body and envelope, transferring the partially vulcanized and expanded enveloped body to a second mold having a mold cavity whose dimensions are substantially the same as those of the finished article, and heating the second mold while permitting the escape of a small quantity of gas from the body through the envelope, whereby the pressure in the cells is equalized and the body is stabilized.

5. The manufacture of a cellular expanded rubber article of given dimensions, which comprises forming a cellular expanded partially vulcanized rubber body completely surrounded by a noncellular rubber envelope, placing the body and envelope in a mold having a mold cavity of the shape and size desired in the finished article and heating the mold while permitting the escape of a small quantity of gas from the body through the envelope, whereby the pressure in the cells is equalized and the body is stabilized.

JAMES URMSTON.